No. 638,590. Patented Dec. 5, 1899.
L. DE F. MUNGER.
COMBINED PNEUMATIC AND CUSHION TIRE AND RIM.
(Application filed July 21, 1899.)
(No Model.)
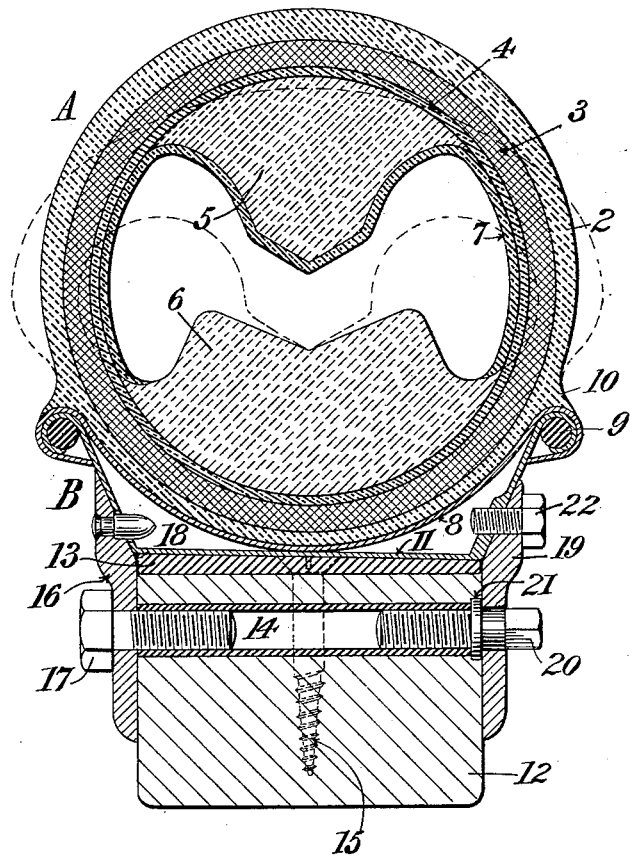
Witnesses:
Raphaël Netter
Augustus Lee Jr
Louis de F. Munger, Inventor
by T. D. Merwin Att'y.

UNITED STATES PATENT OFFICE.

LOUIS DE F. MUNGER, OF NEW YORK, N. Y., ASSIGNOR TO THE NATIONAL WHEEL AND TRACTION COMPANY, OF SAME PLACE.

COMBINED PNEUMATIC AND CUSHION TIRE AND RIM.

SPECIFICATION forming part of Letters Patent No. 638,590, dated December 5, 1899.

Application filed July 21, 1899. Serial No. 724,637. (No model.)

*To all whom it may concern:*

Be it known that I, LOUIS DE F. MUNGER, of New York, Brooklyn borough, county of Kings, State of New York, have invented a new and useful Combined Pneumatic and Cushion Tire and Rim, of which the following is a specification.

My invention relates to improvements in pneumatic tires and rims therefor, its object being to provide a non-collapsible pneumatic tire and an improved means of attachment of the same to the wheel-felly, specially designed for use on traction-wheels of automobile-vehicles.

To this end my invention consists, essentially, in providing an ordinary pneumatic tire substantially circular in cross-section, with interiorly oppositely-disposed buffer ribs or cushions, one adjacent the tread of the tire and the other adjacent the rim. These buffer-ribs are of such dimensions and shape and so positioned that the tire is protected against collapse by reason of excessive load or deflation, the ribs being brought into contact under such circumstances and automatically forming thereby a cushion-tire. The conformation of the meeting faces of the ribs is such as to cause them to interlock and prevent lateral displacement of one upon the other, and consequent lateral distortion of the tire, as would be the case if the ribs slipped out of engagement with each other, permitting the tire to collapse, which could readily occur when the vehicle is turning a corner or traveling upon a lateral incline. The preferred form in cross-section of the ribs is shown in the accompanying drawings, in which one is provided with a V-shaped groove and the other with a correspondingly-shaped tenon to fit the same.

My invention further consists in providing an annular metallic rim or bed for the tire, to which all of the meeting surface of the tire is permanently vulcanized. This rim or bed is fitted to slip upon the wheel-felly and be thereon detachably secured, the rim thus being made a permanent part of the tire itself and attached to and detached from the wheel with it.

The accompanying drawing, forming part of this specification, shows my improved tire and its connections with the wheel-felly, all in cross-section.

The tire A is made up of a compound structure of an exterior layer or tread 2 of rubber, layers of fabric or cloth 3, inner air-tube 4, buffer-ribs 5 and 6, and supplementary inner air-tube 7, which covers the inner surface of the buffer-ribs 5 and has its edge vulcanized upon the tube 4, thus forming a further protection against leakage from any rupture or puncture through the tread of the tire. The upper tread-rib 5 is V-shaped, or it may be rounded or of other suitable form that will give a central depending ridge and side walls. The base-buffer rib 6 has a conversely-shaped groove to receive the tread-buffer, so that the latter will enter the base-buffer and be interlocked therewith, so as to prevent lateral displacement of the buffers and distortion of the tire. Between and around the buffer are airspaces which extend to the edges of the side walls of the tire and between the buffers and the edges of the tire and are substantially elliptical in form. The outer side wall of each air-space is thus parallel for its whole length with the outer periphery of the tire, and the center of the elliptical spaces is slightly above the center of the tire, so that when the tire is depressed and the buffers are in contact these centers will coincide. By these features when the buffers are pressed into contact the side walls of the tire will be bent in a perfect curve and the side spaces into substantially circular form. The shape and size of these air-spaces will give practically the same effect as the air-space in an ordinary pneumatic tire when the central tread-surface is depressed and elliptical air-cushions formed on either side thereof. The buffers 5 and 6 are made integral with the tire.

The rim B is made up of the concave annular ring 8, conforming to the curvature or shape of the inner periphery of the tire, and to which the latter is permanently vulcanized. The edges of the ring 8 are outturned to embrace a strengthening-wire 9, the tire being preferably provided with soft-rubber shoulders or ribs 10, lying over the edges of the ring 8 and vulcanized thereto. These ribs strengthen the connection in case of lateral strain and tend to prevent breaking away of the tire from the rim and resultant chafing. In order to fit the rim to the wheel-felly, I preferably attach to the ring 8 another sheet-metal ring 11, shaped to the periphery of the felly 12 and with its edges turned over the wire 9, inside of the rolled edges of the ring 8, the rings being brazed together at their points of contact, if desired, to make the connection more secure, as along their medial line. The ring 11 is seated upon the steel tire 13 upon the face of the felly 12, which tire is slightly beveled or inclined, as shown, whereby the tire and rim can be readily slipped on and off the wheel. I provide the wheel-felly with a series of transverse interiorly-threaded tubes or sleeves 14, anchored in place by means of wood-screws 15, which serve also to hold in place the steel tire 13.

16 is an annular clamping-ring permanently attached to the inner or body side of the wheel by means of the bolts 17, threaded into the sleeves 14. The ring 16 also has studs 18, permanently secured thereto and adapted to enter holes or sockets in the rim B. On the outer side of the wheel I arrange a smaller clamping-ring 19, adapted to be slipped upon the wheel after the tire is in place and to be held thereon by means of bolts 17, (not shown,) threaded into alternating sleeves 14, and to be removed from the wheel by a series of backing-off bolts 20, alternating with the bolts 17, and having shoulders 21 engaging the inner face of the ring 19, whereby the bolts 20 on being unscrewed will carry the ring 19 off from the wheel. The ring 19 is secured to the wheel-rim B by means of bolts or screws 22, so that when the annular ring 19 is drawn off from the wheel by means of the backing-off screws 20 the tire and rim are drawn off with it.

The operations of attaching and detaching the tire are obvious from the foregoing construction. The bolts 20 are screwed home into their respective sleeves. The annular ring 19 is then applied and secured to the rim by means of the screws or bolts 22 and the whole then driven into place by means of the bolts 17, alternating with the bolts 20. In removing the tire the bolts 17 are first removed, and then by unscrewing the bolts 20 the ring 19 and the connecting-rim B and tire A are drawn off the felly.

In use with a light or ordinary load the tire acts as a simple pneumatic tire. In case, however, of excessive load or a partial deflation of the tire the buffer 5 becomes seated upon and engages with the buffer 6, opposite the bearing-point of the wheel upon the pavement, and the tire is thus prevented from entirely collapsing or receiving injury by lateral distortion.

I claim—

1. A non-collapsible pneumatic tire, circular in cross-section, provided with interiorly, oppositely-disposed surfaces formed on the inner periphery of the tire with air-spaces between and around them and extending entirely across the tire to the air-tube, said surfaces provided with means to engage and interlock, whereby collapsing, and lateral distortion of the tire are prevented, substantially as described.

2. A pneumatic tire circular in cross-section provided with interiorly oppositely-disposed ribs, said ribs having interlocking meeting faces, and air-spaces on both sides of said ribs extending entirely across the tire to the air-tube, whereby when the said ribs engage the lateral displacement of the same and distortion of the tire are prevented, substantially as described.

3. A pneumatic tire provided with a buffer-ridge on the interior of its tread-surface, and an interior groove in the tire opposite said ridge and correspondingly shaped to receive the same on the deflation of the tire or under excessive pressure thereon to thereby prevent the collapse of the tire and limit the inward depression of the tread, and air-spaces on both sides of said buffer-ridge and extending entirely across the tire to the air-tube, substantially as described.

4. As an improved article of manufacture, a tire of the class described, having an annular metallic ring conforming to its inner periphery, and with all its contacting surface permanently vulcanized thereto, the ribs or shoulders upon the tire overlapping and vulcanized to the edges of the rim, the strengthening-wire in the rim edges, and the annular ring conforming to the face of the wheel-felly and fitted thereto and permanently attached to the ring vulcanized to the tire, and adapted to be detachably connected to the wheel.

5. A tire of the class described, in combination with a metallic ring conforming to its inner periphery and having its entire contacting surfaces vulcanized thereto, strengthening-wire included in the edges of the ring the ribs upon the tire overlapping and vulcanized upon the edges of said ring, the annular ring conforming to the face of the wheel-felly and permanently secured to said first-named ring, annular clamping-rings upon the sides of the felly, engaging and securing in place the rings attached to the tire.

6. In combination with a tire, a felly, a detachable tire-rim, means for fastening said rim to the felly consisting of clamping-bolts and removing-bolts having shoulders interior the ring substantially as described.

7. In combination with a tire, a felly, a detachable tire-rim, contacting surface of said felly and rim tapered, means for fastening said rim to the felly consisting of clamping-bolts and removing-bolts having shoulders interior the ring, substantially as described.

Signed at New York city, New York, this 11th day of July, 1899.

LOUIS DE F. MUNGER.

Witnesses:
T. D. MERWIN,
AUGUSTUS LEE, Jr.